July 27, 1926. 1,594,328
J. W. WINTER
PIPE CONNECTION FOR CONTAINERS
Filed Dec. 4, 1924 2 Sheets-Sheet 2
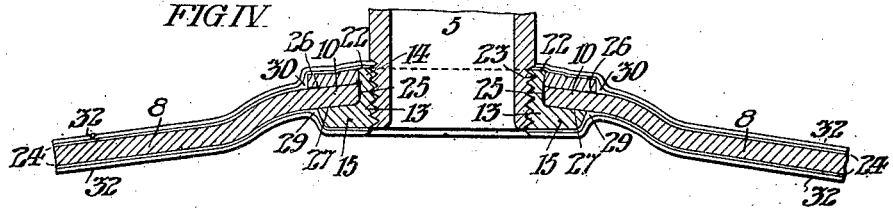
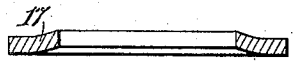
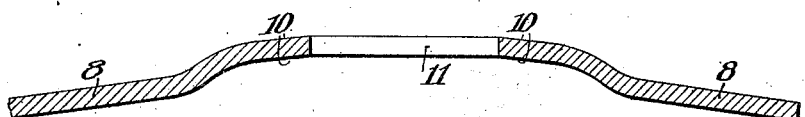
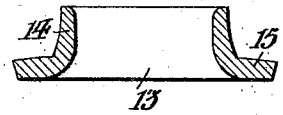
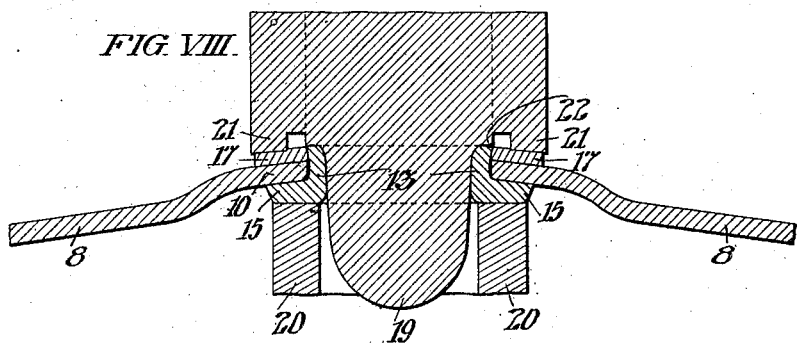
INVENTOR:
JOSEPH WILLIAM WINTER Patented July 27, 1926.

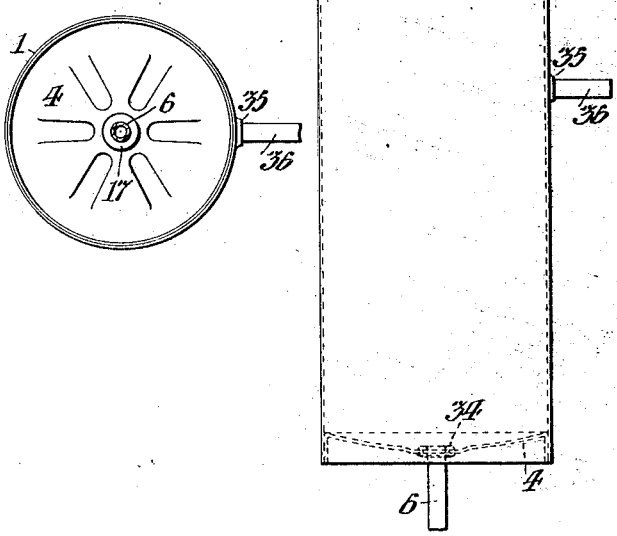

1,594,328

UNITED STATES PATENT OFFICE.

JOSEPH WILLIAM WINTER, OF PENFIELD, PENNSYLVANIA, ASSIGNOR TO JOHN WOOD MANUFACTURING COMPANY, OF CONSHOHOCKEN, PENNSYLVANIA, A CORPORATION OF PENNSYLVANIA.

PIPE CONNECTION FOR CONTAINERS.

Application filed December 4, 1924. Serial No. 753,799.

My invention is particularly applicable to containers of the type known as "range boilers", i. e., water tanks provided with pipe fittings for inclusion in a water circulating system with a kitchen range waterback, or other water heating means. Such containers include a cylindrical tubular body or shell having opposite end closures and provided with means for screw threaded connection with ordinary water pipes through which water is circulated to and from the water chamber within the container. My improvement relates particularly to the method of and means for providing such a container with suitable pipe connecting means.

Heretofore, it has been the ordinary practice to provide such containers with what are known to the trade as "spuds", to wit, annular pieces of cast or wrought metal which are riveted or otherwise secured at openings in the container shell or its opposite end closures, or both; which spuds are screw threaded to engage the pipes aforesaid. Such devices of the prior art are unsatisfactory, in that it is not only difficult to make a tight joint between the primarily separate metal of the spud and the metal of the container shell or closure, but even after such a joint is made water-tight; it may be caused to leak under the stress to which the spud is subjected when a pipe is screwed into it; such stresses, of course, tending to twist the spud in its seat in the container wall. Moreover, as the screw threading operation is the last performed upon the container after the latter has been brazed at its joints and galvanized or otherwise coated inside and outside with alloy which is principally zinc; it is impossible to discover defects in the spuds at the portions thereof where the screw threads must be cut, until such final screw threading operation, and it may be then discovered that some spud in the container is so defective that a tight screw threaded connection cannot be made therewith, and the entire container must be scrapped because of such defect.

Therefore, it is the object of my invention to avoid the defects aforesaid by providing two wrought metal reinforcements at each region of the container where it must be screw threaded for a pipe connection, and of such character that the reinforcements become an integral part of the container without any possibility of development of such defects as above noted with respect to the devices of the prior art.

As hereinafter described; one such reinforcement is applied inside the container wall and the other outside. The inside reinforcement is primarily a plane annular plate washer, conveniently punched from a stock sheet of rolled steel. However, said washer is drop forged hot to draw its central portion into a truncated conical tube with a substantially plane annular flange at its base. The tubular portion of that reinforcement is inserted through an opening in the container wall and, thereupon, the other reinforcement which is a plane annular plate washer also conveniently punched from a stock sheet of rolled steel, is fitted over the protruding tubular portion of said first reinforcement; whereupon, both reinforcements are distorted together, by expanding them outwardly and finally turning over the tubular portion of said first reinforcement upon the outer surface of said second reinforcement in a toric bead; the annular plane portions of both said reinforcements being compressed against the container wall during such operation so as to immediately permanently engage them with said wall without other means. That operation leaves the structure with an opening which is conically convergent inwardly with respect to the container and thus adapted to receive a pipe screw thread which is thus convergent.

Thereafter, the portion of the container provided with said reinforcements is brazed, conveniently by dipping it in a bath of suitable molten alloy and, thereafter, the container, complete except for screw threading, is dipped in a molten bath of a coating alloy, preferably spelter, until the metal of the container is coated both inside and outside and, thereafter, said container is provided with suitable pipe threads at each of the socket openings formed as above described.

My invention includes the various novel features of construction, arrangement and procedure hereinafter more definitely specified.

In said drawings; Fig. I is an elevation of a container, of the range boiler type, embodying my invention.

Fig. II is a plan view of the upper end closure of said container.

Fig. III is an inverted plan view of the lower end closure of said container.

Fig. IV is a fragmentary diametrical sectional view, taken on the line IV, IV in Fig. II and showing the completed structure.

Fig. V is a fragmentary diametrical sectional view, similar to Fig. IV, but showing the outer washer reinforcing member before it is assembled.

Fig. VI is a fragmentary diametrical sectional view of said container closure, as shown in Fig. IV, but before being thus reinforced.

Fig. VII is a fragmentary diametrical sectional view of the inner reinforcement, before its introduction to the container.

Fig. VIII is a fragmentary diametrical sectional view of said container closure shown in Fig. IV, with the two reinforcements assembled therein, as in that figure, but before they are brazed or screw threaded.

Referring to Fig. I; the container includes the cylindrical tubular body or shell 1, which is conveniently formed of a primarily flat sheet of steel, or other ferric metal, which is rolled to form a cylinder with edges abutting at the line 2, where said edges are electrically or otherwise welded, to form a watertight joint. Said container 1 is provided with the upper end closure 3 and the lower end closure 4. Said closures 3 and 4 are respectively provided with water pipes 5 and 6.

I find it convenient to explain my invention with reference to the upper end closure 3 of said container 1, which is shown in fragmentary section in Fig. IV. Said closure 3 is conveniently pressed to the peculiar form shown in Figs. I and II from a primarily flat sheet of steel or other ferric metal, and includes the convex web 8 having the cylindrical rim flange 9, in unitary relation therewith. Said closure web 8 has the panel 10 pressed therein of the configuration best shown in Fig. VI, with rounded edges merging into the convex surface of said web 8 and forming a reinforcement seat. The circular hole 11 is punched through the metal of said closure 3 during the operation of forming the latter and at the region where it is desired to connect said pipe 5 but, as indicated, somewhat larger than said pipe.

The inner reinforcement 13, shown detached in Fig. VII, is primarily a plane annular plate washer, punched from a stock sheet of rolled steel. However, said washer is drop-forged hot to draw its central portion into the truncated conical tube 14 with the substantially plane annular flange 15 at its base. Said tubular portion 14 of the reinforcement 13 is inserted through said opening 11 in the container wall and, thereupon, the other reinforcement 17, which is a slightly dished annular plate washer, also conveniently punched from a stock sheet of rolled steel, is fitted over the protruding tubular portion 14 of said reinforcement 13. Thereupon, both reinforcements are distorted, together, by expanding them outwardly, conveniently by a male die member 19 pressed axially therein while said reinforcement 13 is supported by the female die member 20. Said die member 20 is opposed by the die member 21 so that the annular plane portions of both said reinforcements 13 and 17 are compressed against the container wall at 10, during such operation, so as to immediately permanently engage them with said wall without other means; the upper edge of said member 14 being turned over said member 17 to form the toric bead 22. That die pressing operation leaves the structure with the opening through said reinforcement 13 conically convergent inwardly with respect to the container, as indicated in Fig. VIII, and thus adapted to receive the pipe screw thread 23, indicated in Fig. IV, which is thus convergent.

However, in proceeding with the manufacture of such a container as indicated in Fig. I; I push the closure 3 into the cylindrical shell 1 of the container to the position shown.

Preparatory to brazing the structure thus assembled; I clean the metal at the regions which are to be brazed, by any suitable means, for instance, by immersing such metal in a detergent liquid which removes all grease and dirt therefrom. I then preheat both the closure 3 and the adjacent portion of the cylinder shell of the container 1, preferably to a visible red, and then invert and dip both the container shell 1 and its closure 3 into a molten bath of brazing alloy, to a depth sufficient to immerse said closure flange 9 in said bath. I find it convenient to form such brazing alloy of fifty parts of copper and fifty parts of zinc, and to maintain the same at a temperature of from 1750 to 1800° F., during the brazing operation; with a suitable flux, such as borax, molten upon the surface of the bath; so that the structure dipped therein is coated with such flux as it enters the brazing metal. The effect of such operation is to cause the brazing alloy to not only penetrate the interstices 25, 26 and 27 indicated in Fig. IV, between the wall of the container and the reinforcements 13 and 17, but also to fillet the inner junction of said elements as indicated at 29 in Fig. IV and fillet the outer junction of said elements, as indicated at 30 in Fig. IV.

It is to be understood that the bottom closure 4 may have a suitable opening therein provided with the reinforcement 34, substantially as above described, for connection of the container with the pipe 6. Similarly, the cylindrical wall of said container 1 may be provided with the reinforced screw threaded socket 35, for connection with the pipe 36.

As above mentioned, it is the ordinary practice to provide such containers as indicated at 1 in Fig. I with a protective coating upon both the outside and the inside surface thereof, formed of an alloy known as spelter, and which is principally zinc, and such coating, which is indicated at 32 in Fig. IV, is formed upon the container after immersing the latter in a detergent liquid which removes all grease and dirt from the metal of the structure, and by then immersing the structure in a molten bath of the coating alloy. Thereupon, the container is removed from the coating bath and drained.

Each of the reinforced openings aforesaid, having been inwardly converged, as above described, to the taper of a standard pipe thread; as the final step in my process, each of said openings is provided with a suitable pipe thread, such as indicated at 23 in Fig. IV.

Although I have explained my invention with reference to the manufacture of a container of the range boiler type; it is to be understood that my improvements are equally applicable to containers of other types. Therefore, I do not desire to limit myself to the precise details of construction, arrangement or procedure herein set forth, as it is obvious that various modifications may be made therein without departing from the essential features of my invention, as defined in the appended claims.

I claim:

1. In a container, the combination with a sheet metal well having an opening therethrough; of two sheet metal reinforcements for said opening, including an inner annular reinforcing plate having a base flange larger than the opening in said wall and a central truncated conical tubular portion smaller than said opening and fitted therein, and extending through said wall; an annular outer reinforcing plate dished so that its circular edge which is radically inward is axially outward with respect to said tubular reinforcement and fitted around the latter; the tubular portion of said inner reinforcement extending through said wall and said outer reinforcement being expanded to a larger outside diameter than the inside diameter of said outer reinforcement; said reinforcements being tightly compressed upon the respectively inner and outer surfaces of said wall; whereby said wall and both its reinforcements are interlocked; a film of brazing alloy extending between said reinforcements and said wall, integrally uniting them, and forming fillets at the junctions of said reinforcements with each other and with said wall; a coating of zinc alloy extending over said wall and reinforcements; and an internal pipe screw thread formed in the tubular portion of said inner reinforcement which extends in said wall.

2. In a container, the combination with a sheet metal wall having an opening therethrough; of two sheet metal reinforcements for said opening, including an inner annular reinforcing plate having a base flange larger than the opening in said wall and a central truncated conical tubular portion smaller than said opening and fitted therein, and extending through said wall; an annular outer reinforcing plate dished so that its circular edge which is radially inward is axially outward with respect to said tubular reinforcement and fitted around the latter; the tubular portion of said inner reinforcement extending through said wall and said outer reinforcement and being inwardly converged, to the taper of a pipe thread, and being expanded to a larger outside diameter than the inside diameter of said outer reinforcement; said reinforcements being tightly compressed upon the respectively inner and outer surfaces of said wall; whereby said wall and both its reinforcements are interlocked; a film of brazing alloy extending between said reinforcements and said wall, integrally uniting them, and forming fillets at the junctions of said reinforcements with each other and with said wall; a coating of zinc alloy extending over said wall and reinforcements; and an internal pipe screw thread formed in the tubular portion of said inner reinforcement which extends in said wall.

3. In a container, the combination with a sheet metal wall having an opening therethrough; of two sheet metal reinforcements for said opening, including an inner annular reinforcing plate having a base flange larger than the opening in said wall and a central truncated conical tubular portion smaller than said opening and fitted therein, and extending through said wall; an annular outer reinforcing plate fitted around said tubular reinforcement; the tubular portion of said inner reinforcement extending through said wall and said outer reinforcement being expanded to a larger outside diameter than the inside diameter of said outer reinforcement; said reinforcements being tightly compressed upon the respectively inner and outer surfaces of said wall; whereby said wall and both its reinforcements are interlocked; a film of metal extending between said reinforcements and said wall, integrally uniting them; a coating of metal extending over said wall and reinforcements; and an internal pipe screw thread formed in the tubular portion of said inner reinforcement which extends in said wall.

4. In a container, the combination with a sheet metal wall having an opening therethrough; of two sheet metal reinforcements for said opening, including an inner annular reinforcing plate having a base flange larger than the opening in said wall and a central truncated conical tubular portion smaller than said opening and fitted therein, and extending through said wall; an annular outer reinforcing plate fitted around said tubular reinforcement; the tubular portion of said inner reinforcement extending through said wall and said outer reinforcement being expanded to a larger outside diameter than the inside diameter of said outer reinforcement; said reinforcements being tightly compressed upon the respectively inner and outer surfaces of said wall; whereby said wall and both its reinforcements are interlocked; and a film of metal extending between said reinforcements and said wall, integrally uniting them.

5. In a container, the combination with a sheet metal wall having an opening therethrough; of two sheet metal reinforcements for said opening, including an inner annular reinforcing plate having a base flange larger than the opening in said wall and a central truncated conical tubular portion smaller than said opening and fitted therein, and extending through said wall; an annular outer reinforcing plate dished so that its circular edge which is radially inward is axially outward with respect to said tubular reinforcement and fitted around the latter; the tubular portion of said inner reinforcement extending through said wall and said outer reinforcement being expanded to a larger outside diameter than the inside diameter of said outer reinforcement; said reinforcements being tightly compressed upon the respectively inner and outer surfaces of said wall; whereby said wall and both its reinforcements are interlocked; and an internal pipe screw thread formed in the tubular portion of said inner reinforcement which extends in said wall.

6. In a container, the combination with a sheet metal wall having an opening therethrough; of two sheet metal reinforcements for said opening, including an inner annular reinforcing plate having a base flange larger than the opening in said wall and a central truncated conical tubular portion smaller than said opening and fitted therein, and extending through said wall; an annular outer reinforcing plate dished so that its circular edge which is radially inward is axially outward with respect to said tubular reinforcement and fitted around the latter; the tubular portion of said inner reinforcement extending through said wall and said outer reinforcement being expanded to a larger outside diameter than the inside diameter of said outer reinforcement; said reinforcements being tightly compressed upon the respectively inner and outer surfaces of said wall; whereby said wall and both its reinforcements are interlocked.

In testimony whereof, I have hereunto signed my name at Conshohocken, Pennsylvania.

JOSEPH WILLIAM WINTER.